United States Patent [19]
Rheinberger

[11] 3,837,884
[45] Sept. 24, 1974

[54] METHOD OF PRODUCING BLUE COLORED TRANSPARENT LAYERS

[75] Inventor: Peter Rheinberger, Furstentum, Liechtenstein

[73] Assignee: Balzers Patent-Und Beteiligungs-Aktiengesellschaft, Balzers, Furstentum, Liechtenstein

[22] Filed: July 10, 1972

[21] Appl. No.: 270,547

[30] Foreign Application Priority Data

July 12, 1971 Switzerland................10243/71

[52] U.S. Cl........... 117/33.3, 117/35 V, 117/106 R, 117/125
[51] Int. Cl............................................ C23c 13/04
[58] Field of Search............ 117/106 R, 106 A, 222, 117/933, 33.3, 125, 62, 35 V, 35 R; 423/118, 328, 594; 252/385; 161/1

[56] References Cited
UNITED STATES PATENTS

| | | | |
|---|---|---|---|
| 2,901,379 | 8/1959 | Shannon et al. | 117/125 |
| 3,306,768 | 2/1967 | Peterson | 117/106 |
| 3,468,646 | 9/1969 | Finn et al. | 65/30 |
| 3,508,894 | 4/1970 | Torok | 65/30 |
| 3,514,320 | 5/1970 | Vaughan | 117/106 |
| 3,552,352 | 1/1971 | McConnell | 117/93.3 |
| 3,711,322 | 1/1973 | Kushihashi et al. | 117/33.3 |

*Primary Examiner*—Charles E. Van Horn
*Assistant Examiner*—J. W. Massie
*Attorney, Agent, or Firm*—McGlew and Tuttle

[57] ABSTRACT

A powdery mixture of cobalt hydroxide, aluminium oxide, and oxides which absorb substantially no visible light, preferably silicon dioxide, is vacuum evaporated in an oxidizing atmosphere and deposited on a base material and subsequently heat treating at approximately 300°C. The coating of the base material thereby obtained is a hard, well adherent, pure blue colored and transparent film. The proportions of the principal components of the primary mixture used for evaporation are 30 to 40 percent of cobalt hydroxide and 5 to 15 percent of aluminium oxide, the refractive index of the whole mixture is approximately equal to the refractive index of the base material and the thickness of the film produced is approximately 1/1000 mm.

9 Claims, No Drawings

METHOD OF PRODUCING BLUE COLORED TRANSPARENT LAYERS

BACKGROUND OF THE INVENTION

1. Field of the Invention

This invention relates in general to vacuum coating of materials and in particular to a new and useful method of vaccum coating of light-transmissive material with blue colored transparent layers of oxide mixtures and to a structure with layers which may be formed by this method. Layers obtained in this way can be advantageously used as filters in the optical technique, as protective coatings for eye-glasses and as coatings for gems or other jewelry, in the ceramics and for other purposes.

2. Description of the Prior Art

It has been proposed to coat base materials by vacuum evaporation of colored glass in order to produce colored, transparent coatings. However, in practice this proposal is hardly realizable because most of the oxides, especially also many of those utilized in glass technology, decompose when evaporated, so that the layers obtained by condensation thereof show a substantially different composition and color. Furthermore, the glasses colored in mass include the coloring substance in such a low concentration that even though a massive piece still shows an intense coloration, a thin layer of some 1/1000 mm of thickness shows practically no coloration. Consequently, if it is desired to produce colored thin layers by evaporation of colored glass, it is necessary to provide layers of increased thickness which, as known from experience, tend to burst or flake-off or at least crack, because the coefficient of thermal expansion of the base and coating material correspond to each other sufficiently only in the most exceptional cases.

It is further known to produce colored coatings on a base material so as to apply by evaporation a thin layer of a metal and a non-metal in an atomic dispersion mixture. Sometimes the metal atoms embedded in the layer give the layer a certain coloration directly. In other cases, on the contrary, a coloration only appears after a heating-up of the layers so deposited, the embedded metal being segregated in colloidal form. For example, colloidal gold produces a ruby coloration.

Nevertheless, up to now the known processes did not succeed in depositing a blue colored, transparent, stable and hard layer with great adhesive strength. The known blue layers of tungsten oxide and molybdenum oxide are susceptible to oxidation and are soluble in water and therefore unstable.

SUMMARY OF THE INVENTION

With the present invention blue colored, transparent, hard and resistant layers suitable for the most various applications are formed on a base material by a method of vacuum evaporation in which a mixture of oxides is applied to base surfaces and subsequently heat treating at relatively low temperature.

In accordance with the invention, the mixture used as a primary substance to be vaporized comprises 30 to 40 percent by weight of cobalt hydroxide ($Co(OH)_2$), 5 to 15 percent by weight of aluminium oxide ($Al_2O_3$) and a remaining part composed of other oxides substantially non-absorbing visible light rays, e.g., preferably of silicon dioxide ($SiO_2$). This mixture is deposited on the base surface by evaporation in an oxidizing low-pressure atmosphere, and the produced layers are then heat treated so as to obtain the desired pure blue coloration.

Accordingly it is an object of the invention to provide a method of coating light transmissive material with blue colored transparent layers of oxide mixtures to provide protective coatings for optical devices, jewelry, ceramics and the like.

A further object of the invention is an improved primary oxide coating mixture for transparent articles.

A further object is to provide a light transmissive article with a protective oxide coating.

The various features of novelty which characterize the invention are pointed out with particularity in the claims annexed to and forming a part of this disclosure. For a better understanding of the invention, its advantages and specific objects attained by its uses, reference should be had to the following descriptive matter in which there is illustrated a preferred embodiment of the present invention.

GENERAL DESCRIPTION OF THE PREFERRED EMBODIMENT

The method of the invention proposes the formation of blue colored transparent layers on base metal and comprises the depositing of a primary mixture of oxides in layers on a base or receiving surface by vacuum evaporation in an oxidizing low pressure atmosphere and subsequently heat treating the layers and at a heat treating temperature which may be below 300°C. A primary mixture advantageously contains 30 to 40 percent by weight of cobalt hydroxide ($Co(OH)_2$; 5 to 15 percent by weight of aluminum oxide ($Al_2O_3$) and a remaining part composed of oxides practically non-absorbing visible luminous rays, preferably of silicon dioxide ($SiO_2$).

In contrast to ceramic processes where the heat treatment of the glaze coatings also produces colorations, the inventive method provides a particular advantage in that the tempering can take place at relatively low temperatures. According to the invention, a temperature of 300°C is sufficient while the known processes require substantially increased temperatures (over 500°C). That is why, quite apart from the fact that up to now it has been entirely impossible to produce by evaporation blue colored transparent layers of the quality assured by the invention, the known technique is only applicable to base materials enduring such high temperatures. But many types of glass must not be exposed to such a heat or, if exposed, their quality changes for the worse as soon as the so-called transformation point is exceeded. Such high temperatures also can result in deformations, and, in numerous cases, the known methods are therefore inapplicable.

While choosing the second oxide or further oxides for the primary mixture, a fact to be considered is that in most applications it is undesirable to produce by the vapor-deposit an increased reflection of the base surface. In order to avoid an increase of the reflection power, it is advisable to choose such oxides whose refractive index is not too different from that of the base material. For usual glass bases with a refractive index of 1.52, $SiO_2$ (quartz) has proved to be excellent. For base materials with a refractive coefficient of 1.52, coatings having a refraction index between 1.45 and 1.57 are admissible without running the risk that a reflection change caused by the coating would be manifestly disturbing. Oxides with matching refractive index and practically non-absorbing visible luminous rays are, for example and in particular, quartz, titanium oxide, zirconium oxide, beryllium oxide, and the like and mutual mixtures of the same.

A further advantages is to be seen in that the inventive layers can be very thin, thanks to their strong absorbing capacity and intense blue coloration. It is more convenient to adjust the desired transparency and blue coloration intensity by a choice of an appropriate thickness of layer than by changing the proportion of $Co(OH)_2$.

The low treatment temperature permitted by the inventive method is probably due to the content of aluminium oxide in the primary mixture used for coating. Besides, it has been found that the indicated two oxides are in any case essential and that the desired layers cannot be produced, for example, by using aluminium oxide alone or by omitting the same.

Owing to the vaporization in oxidizing atmosphere and to the after-treatment, the cobalt hydroxide contained in the primary mixture is converted in an oxide form and forms with the other oxide components of the layer a crystalline solid solution.

Thus, layers produced by evaporation on base materials in accordance with the invention are composed of a basic oxide substance which absorbs substantially no visible luminous rays into which coloring substances are embedded, and which is characterized by a content by weight of 5 to 15 percent of aluminium oxide and of 20 to 40 percent cobalt in oxide combined form.

With the inventive method the primary mixture of oxides are first brought into a form advantageous for the evaporation technique. To this purpose, a powdery mixture of 10 percent by weight of $Al_2O_3$, 35 percent by weight of $Co(OH)_2$ and 55 percent by weight of $SiO_2$ is introduced in a vacuum furnace, kept there for half an hour at 1,250°C and sintered together to a block of compact material. This agglomerate is then pulverized and the powder thereby obtained, having the above indicated composition, is used as primary mixture for the subsequent vacuum coating. The best manner is to use in the evaporation procedure a water-cooled copper crucible and a beam of electrons. Attention is to be paid that all of the components are evaporated uniformly, i.e., that no preferred evaporation of any of the components takes place. Such an appropriate evaporation technique is known.

In the present example, the evaporation of the indicated primary mixture, for instance on a glass base, first produces a grayish blue layer. For a given quantity of the evaporated substance, the thickness of this layer depends on the distance between the source of vapor and the base to be coated and, in the present case, is approximately 1/1000 mm. The evaporation is carried out under a partial $O_2$-pressure in the coating plant of approximately $4.10^{-4}$ torr and the depositing rate is approximately 180 nm/min.

After the glass plate is coated with the temporarily greyish blue layer by evaporation it must be heat treated. In the present example, heat treatment for half an hour at approximately 300°C in a furnace with air under atmospheric pressure is sufficient. Thereby, the greyish blue layer changes into an intensely colored pure blue coating. This coating is hard and adheres excellently to the glass plate.

Surprisingly, it has been found that in this case the oxidizing atmosphere is indispensable for the coating by evaporation. If the primary mixture indicated in the example is applied by evaporation in a high vacuum without oxidizing atmosphere, a greyish brown layer is obtained that can not be changed into the desired pure blue coating by heat treating.

It is not recommended that the mixture be incorporated in a carbon container or in a tungsten crucible because in such a case reactions between the components of the mixture can take place leading to useless layers.

While a specific embodiment of the invention has been described in detail to illustrate the application of the principles of the invention, it will be understood that the invention may be embodied otherwise without departing from such principles.

What is claimed is:

1. Method of coating blue colored transparent layers on the surface of a base material, which comprises (a) depositing by vacuum evaporation on said surface in an oxidizing low-pressure atmosphere a primary composition containing an admixture of from about 30 to about 40 percent by weight of cobalt hydroxide ($Co(OH)_2$), from about 5 to 15 percent by weight of aluminum oxide ($Al_2O_3$) and a remaining part composed of at least one oxide which absorbs substantially no visible luminous rays, and (b) subsequently heat treating the so-formed layers on said surface to reduce the cobalt hydroxide to an oxide and form a pure blue coloration.

2. The method according to claim 1, wherein said oxide comprises silicon dioxide ($SiO_2$).

3. The method according to claim 1, wherein said primary composition contains about 10 percent by weight of $Al_2O_3$.

4. The method according to claim 1, wherein said primary composition contains about 35 percent by weight of $Co(OH)_2$.

5. The method according to claim 1, wherein said primary composition has a refractive index approximately equal to the refractive index of the base material which is to be coated.

6. The method according to claim 1, wherein the step of depositing by evaporation of said primary composition takes place in an oxygen atmosphere under a pressure of the order of $10^{-4}$ torr (mm Hg).

7. The method according to claim 1, wherein the layers after deposition on the surface of the base material are heat treated for about 30 minutes at approximately 300°C in an oxygen-containing atmosphere.

8. Protective vacuum deposit coating for light transmissive or reflective articles which comprises an oxide composition containing from about 5 to about 15 percent by weight of aluminum oxide and from about 20 to about 40 percent by weight of cobalt hydroxide.

9. The protective vacuum deposit coating according to claim 8, wherein said oxide composition also contains silicon dioxide.

* * * * *